US006148526A

United States Patent [19]
Kirn et al.

[11] Patent Number: 6,148,526
[45] Date of Patent: Nov. 21, 2000

[54] MANUALLY DRIVEN MACHINE

[75] Inventors: Manfred Kirn, Stuttgart; Manfred Bleicher; Gerd Hahn, both of Leinfelden-Echterdingen; Justus Lamprecht, Dusslingen; David Matzo, Leinfelden-Echterdingen; Herbert Faerber, Stuttgart; Andreas Hoelderlin, Besigheim; Joerg Dehde, Steinenbronn, all of Germany; Leon Bujalski, Chicago, Ill.; Alex Gawron, Park Ridge, Ill.; Michael Holzer, Jr., Wauconda, Ill.

[73] Assignee: Robert Bosch GmbH, Stuttgart, Germany

[21] Appl. No.: 09/117,320

[22] PCT Filed: Sep. 6, 1997

[86] PCT No.: PCT/DE97/01980

§ 371 Date: Feb. 1, 1999

§ 102(e) Date: Feb. 1, 1999

[87] PCT Pub. No.: WO98/23410

PCT Pub. Date: Jun. 4, 1998

[30] Foreign Application Priority Data

Nov. 29, 1996 [DE] Germany .......................... 196 49 514

[51] Int. Cl.[7] .......................... B23D 45/16; B24B 45/00; B27B 5/32

[52] U.S. Cl. ................................ 30/388; 30/337; 30/342; 83/666; 83/698.41

[58] Field of Search .............................. 30/388, 376, 337, 30/338, 339, 342, 390, 391; 83/698.11, 698.31, 666, 690.41, 665; 403/259, 261; 451/359, 509, 516; 125/15, 20; 144/218; 192/54, 55.1, 56.1, 56.2

[56] References Cited

U.S. PATENT DOCUMENTS

| | | | |
|---|---|---|---|
| 2,586,530 | 2/1952 | Godfrey | 30/388 |
| 5,107,737 | 4/1992 | Tagliaferri | 83/665 |
| 5,447,086 | 9/1995 | Wittmaier et al. | 83/666 |

FOREIGN PATENT DOCUMENTS

| | | | |
|---|---|---|---|
| 0 231 500 A3 | 8/1987 | European Pat. Off. . | |
| 1360283 | 3/1964 | France | 30/388 |
| 1289292 | 2/1969 | Germany | 30/388 |
| 44 21 480 A1 | 3/1995 | Germany . | |

*Primary Examiner*—M. Rachuba
*Assistant Examiner*—Boyer Ashley
*Attorney, Agent, or Firm*—Michael J. Striker

[57] ABSTRACT

A handheld machine tool, for example a circular saw, has a disk-shaped tool which is driven in rotation in a housing which holds a drive motor and a tool shaft carrying the tool. The tool can be clamped between a clamping nut, a clamping screw, and two supporting flanges. One supporting flange can be rotated easily relative to the tool shaft without use of auxiliary tools and is supported with an extensive friction at the tool. This supporting flange can be dependably clamped or loosened without tools. The machine tool further has an adjusting device which is coupled with that supporting flange to displace the latter axially toward the tool when that supporting shaft is rotated relative to the tool shaft due to rotational driving. The adjusting device therefore clamps the tool with an increasing force and tries to displace that supporting flange axially away from the tool automatically when the tool is stopped and accordingly reduces the clamping force.

16 Claims, 3 Drawing Sheets

MANUALLY DRIVEN MACHINE

BACKGROUND OF THE INVENTION

The invention relates to a handheld machine tool according to the generic part of claim 1.

A handheld grinding tool known from DE-OS 44 21 480 carries a grinding disk on its driven shaft between two clamping flanges. The outer clamping flange can be tightened against the grinding disk via a thread. The inner flange is supported so as to be rotatable relative to the driven spindle with low friction by means of a solid lubricant. When the outer clamping flange is rotated in the loosening direction, the inner clamping flange can easily be rotated jointly with the grinding disk. Therefore, the outer clamping flange can be loosened by slight force and the grinding disk can be exchanged easily.

This solution has the disadvantage that the outer flange tries to loosen when the grinding spindle is braked abruptly, resulting in the risk that the grinding disk will spin away from the grinding spindle with great force which leads to a corresponding risk of injury to persons in the vicinity.

Since the self-clamping effect in the prior art resulting from the fact that the clamping screw was carried along by the saw blade could be so great that the clamping screw could not be loosened manually but only by means of a tool, it was always necessary to bring along a tool and, in most cases, to use it for changing the saw blade. This was accordingly time-consuming.

EP 0 231 500 discloses fast-clamping systems for easy detachment of grinding disks, saw blades or the like in handheld machine tools which operate satisfactorily, but which, when the tool shaft is stopped, do not automatically reduce the clamping torque in such a way that the tool can be detached easily by rotating the outer clamping flange manually.

SUMMARY OF THE INVENTION

The handheld machine tool according to the invention with the characterizing features of claim 1 has the advantage that when the tool shaft is stopped the outer clamping flange or clamping pin can be easily loosened by hand without additional tools. Due to the fact that the clamping mechanism which automatically loosens and tightens is arranged in the interior of the handheld machine tool, it cannot be lost and is protected against soiling by dust and chips. Further, it is possible to use an inexpensive mass-produced or standard part as a clamping screw or outer clamping flange.

Due to the fact that the clamping mechanism is substantially formed of a pair of disks with rolling bodies arranged therebetween which are held in a determined position by a torsion spring or leg spring, it is especially easy to assemble as a structural component group.

Assembly effort is reduced in that the clamping mechanism can be fitted in a preassembled manner as a constructional unit with the drive pinion for the tool shaft.

Due to the flat head of the head screw and the especially flat outer flange, there is no reduction in the depth of cut when making miter cuts of more than 45° compared with straight cuts because, in spite of the inclined position of the saw shaft, there is no danger of the axially outermost portion of the head screw or of the outer flange striking against the workpiece before reaching the maximum cutting depth for straight cuts.

Due to the fact that the saw shaft bearing is arranged on the outer circumference of the sleeve region of the outer disk, particularly large bearing dimensions can be selected. A large needle bearing of this kind has improved wear behavior compared with needle bearings of comparatively smaller dimensions.

The time expended for changing saw blades is consistently reduced in every case. Further, the previous risk that the saw blade would accidentally detach from the saw shaft in the event that the saw shaft stops abruptly is eliminated.

A further advantage of the invention consists in that the cavities in the pair of disks can be contoured in such a way that the rolling bodies pass through a perceptible pressure point after which the clamping torque ceases to increase. This facilitates handling of the clamping device because the operator is clearly alerted when the clamping position is reached and that clamping is therefore concluded.

BRIEF DESCRIPTION OF THE DRAWINGS

An embodiment example of the invention is described more fully in the following description with reference to the accompanying drawing.

DETAILED DESCRIPTION OF THE PREFERRED EMBODIMENTS

Figure 1:
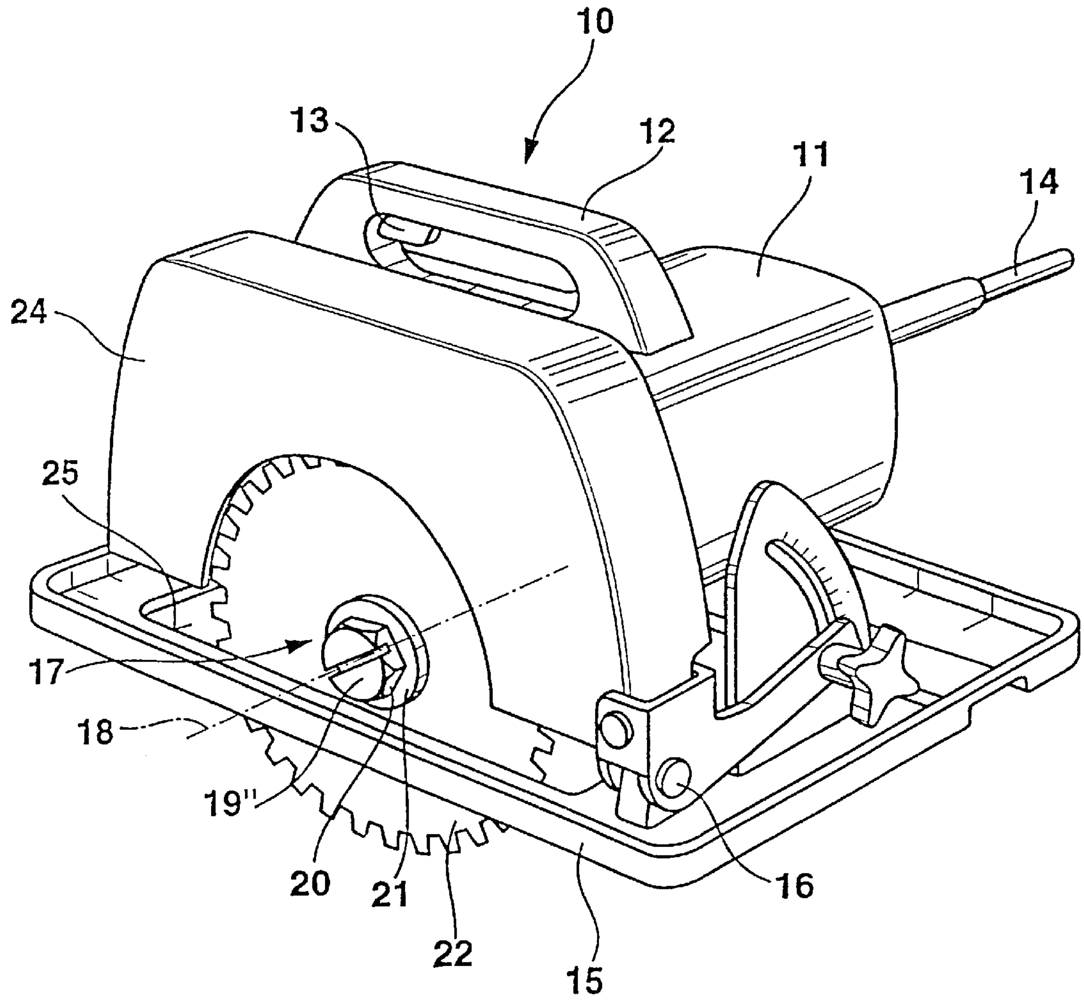
FIG. 1 is a perspective view of a handheld circular saw according to the present invention.

The handheld circular saw 10 shown in FIG. 1 has a housing 11 having a handle 12 and containing an on/off switch 13 and an electrical connection cable 14. The housing 11 is arranged at a base plate 15 so as to be swivelable at a joint 16. The housing 11 contains a motor, not shown. This motor drives a saw shaft 17 by means of a driving pinion 28 (FIG. 2) of a motor shaft. This saw shaft 17 is supported so as to be rotatable about an axis 18. A head screw 20 which can be screwed into an internal-threaded portion 19 (FIG. 2) of the saw shaft 17 and which has a particularly flat head 19" clamps a particularly flat outer flange 21 axially against a saw blade 22.

The saw blade 22 is enclosed, in its region arranged above the base plate 15, by a saw blade housing 24 and passes downward out through a through-slot 25 arranged in the base plate.

Figure 2:
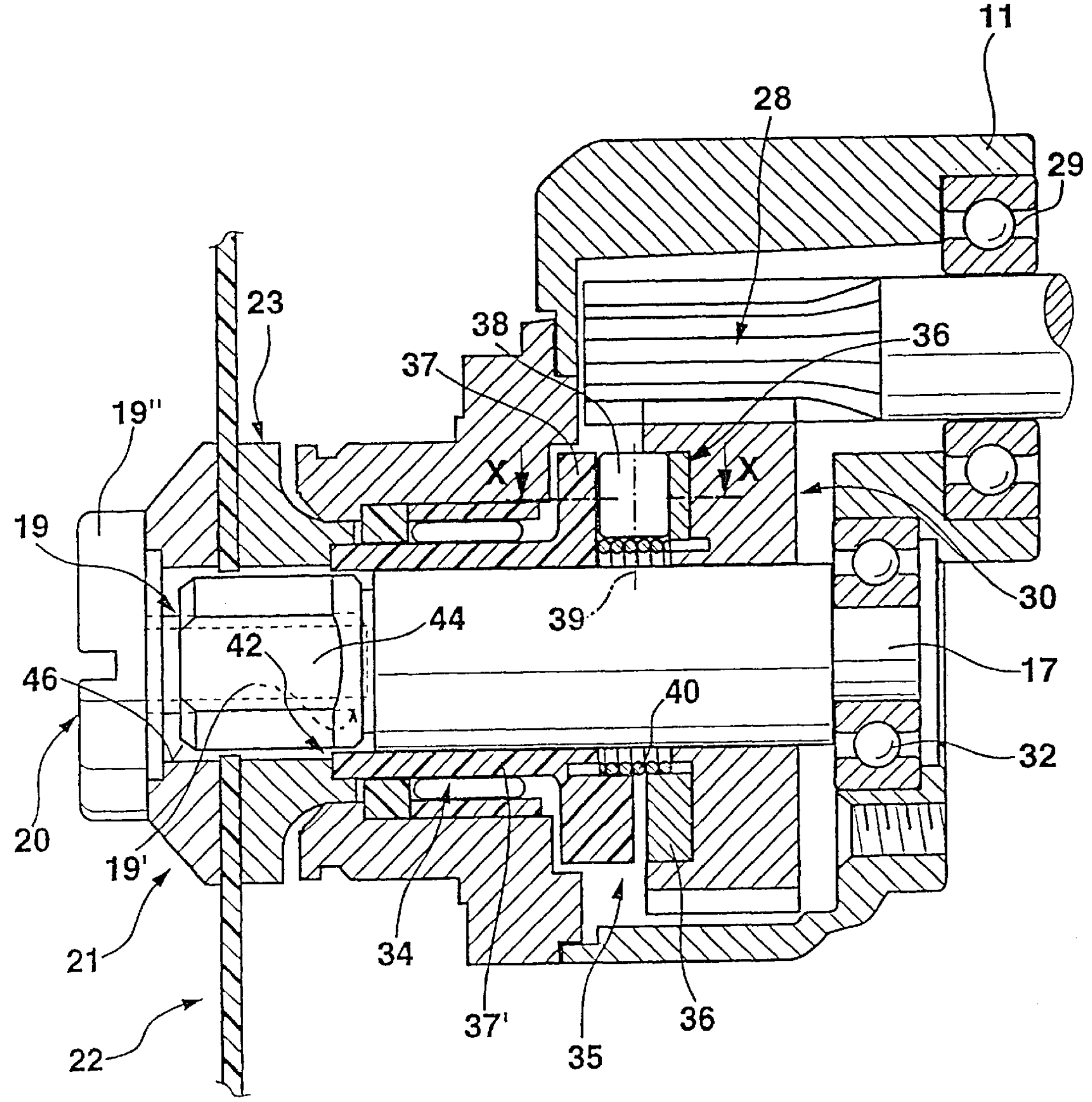
FIG. 2 is a partial longitudinal sectional view of the circular saw of FIG. 1 in the region of the saw shaft with a clamping mechanism.

FIG. 2 is a sectional view of the handheld circular saw 10 in the region of the saw shaft 17. This saw shaft 17 is supported in the housing 11 via saw shaft bearings 32, 34 so as to be rotatable and fixed with respect to axial displacement. The saw shaft 17 is driven by means of a pinion 28 of the motor shaft which is supported in a motor bearing 29 in the housing 11 and which is arranged parallel to the saw shaft 17.

The pinion 28 engages with a driven pinion 30 which is fitted to the saw shaft 17 so as to be fixed with respect to rotation relative to it. On its left-hand end side, considered in the viewing direction, the driven pinion 30 carries an inner disk 36 of a pair of disks 35 such that this inner disk 36 is fixed with respect to rotation relative to it. An outer disk 37 of the pair of disks 35 is arranged after this inner disk 36 axially, wherein a plurality of rolling bodies 38 which are spaced apart are supported and guided so as to be rotatable and so as to enable them to roll about their respective axis of rotation 39.

The inner disk 36 and outer disk 37 are rotated relative to one another so as to be pretensioned via a leg spring 40 which engages axially in the disks 36, 37 via legs, not shown more fully.

The outer disk 37 continues into a sleevelike shaft 37' which is coupled at its front in a positive engagement with the right-hand end of the inner flange 23, considered in the viewing direction, wherein the saw shaft bearing 34 which is a large-diameter needle bearing is seated externally on the outer cylindrical surface of the outer disk 37. The outer disk 37 is mounted, jointly with the inner flange 23, so as to be rotatable relative to the saw shaft 17. The saw blade 22 is supported at the left-hand side of the inner flange 23 considered in the viewing direction, preferably with increased friction, e.g., by means of regions of greater roughness.

The saw shaft 17 carries in its left-hand end, considered in the viewing direction, an internal-threaded portion 19 in which the threaded shaft 19' of the head screw 20 engages by screwing.

The head screw 20 is supported by its head 19" axially against the outer flange 21 whose central polygon hole 46 tightly encloses the end of the saw shaft 17 which is shaped externally with two cheeks or flat sides, one of which is shown as a flattened portion 44. The outer flange 21 is accordingly secured relative to the saw shaft 17 so as to be fixed with respect to rotation relative to it.

The variants shown in FIGS. 3, 4, 5 and 6 show pairs of disks 35 in section corresponding to section arrows X—X according to FIG. 2, at a 90-degree rotation, with differently contoured cavities for receiving the rolling bodies 38.

Figure 3:
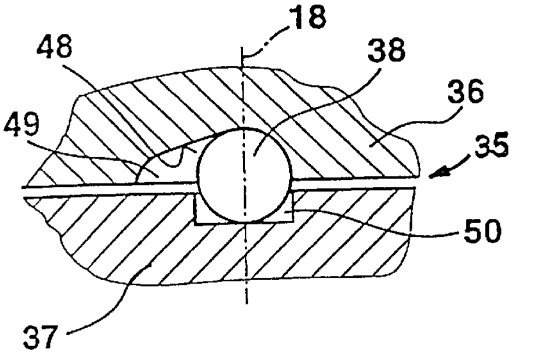
FIGS. 3 through 6 show different embodiments of the pair of disks in the region of the rolling body bearing arrangement.

It can be seen from FIG. 3 that the inner disk 36 has a cavity 49 with an inclined surface 48 and rounded flanks on which the rolling body 38 can roll as if on an oblique plane so as to be limited on the left and right sides by rounded flanks. A cavity 50 which is arranged in the outer disk 37 and has a cornered contour with no inclined surface holds the rolling body 38 in a cage-like manner, so that the latter can change its position relative to the outer disk only minimally.

Figure 4:
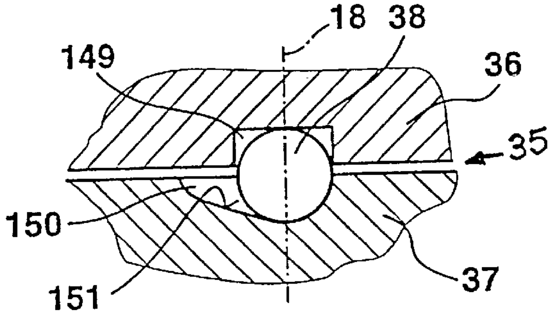

FIG. 4 shows the reverse arrangement in comparison to FIG. 3, i.e., the inner disk 36 has a planar cavity 149 and the outer disk 37 has a recess 150 provided with an inclination 151 and with rounded sides.

Figure 5:
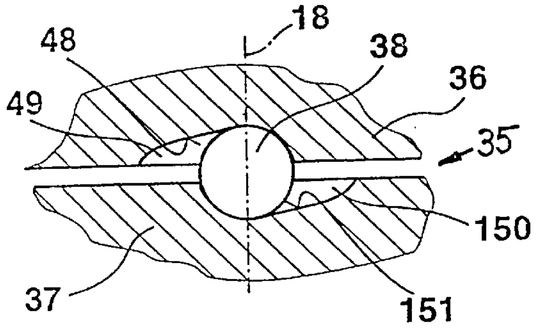
Figure 6:
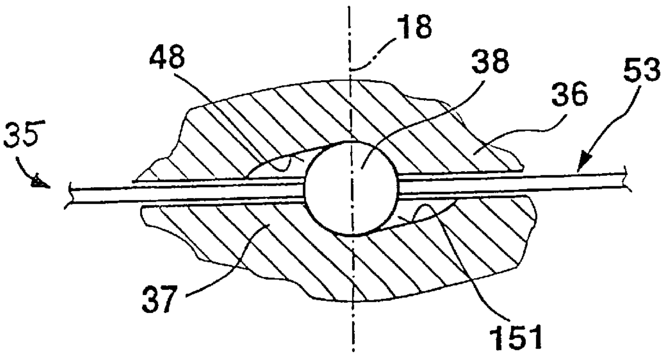

In FIGS. 5 and 6, the inner disk 36 and outer disk 37 have cavities 49, 150 with inclined surfaces 48, 151, wherein these cavities 49, 150 are arranged so as to be offset and so as to run in opposite directions relative to one another. Further, the rolling body 38 in FIG. 6 is guided in a separate disk-like cage 53.

Figure 7:
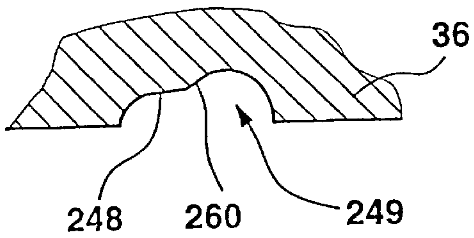
FIG. 7 shows a contour of a rolling body bearing in one of the disks.

FIG. 7 shows an inclined cavity 249 with an uneven portion 260 which causes a pressure point at the clamping device when the rolling body 38 rolls along it, after which pressure point the clamping torque ceases to increase. This pressure point facilitates handling of the clamping device. The uneven portion is to be dimensioned in such a way that the rolling bodies can always easily roll back into the loosening position. The clamping device according to the invention operates as follows: The head screw 20 is turned manually relative to the saw shaft 17, wherein the outer flange 21 is supported axially at the saw blade 22 which is accordingly pressed against the inner flange 23 with increasing axial force. The inner flange 23 is supported axially toward the right-hand side, considered in the viewing direction, against the outer disk 37 of the pair of disks 35 and by the rolling bodies 38 against the inner flange disk 36, the driven pinion 30 and the bearing 32.

The leg spring 40 is pretensioned in such a way that it tries to rotate the pair of disks 35 relative to one another such that the rolling bodies 38 are supported at the lowest point of the recesses 50 and cavity 49 and that the axial spacing between the inner disk 36 and outer disk 37 is minimal. When the motor, and therefore the motor shaft 28, is set in motion by actuating the on/off switch 13, the saw shaft 17 simultaneously rotates jointly with the driven pinion 30, the pair of disks 35, the rolling bodies 38, the inner flange 23, the saw blade 22, the outer flange 21, and the screw 20. Due to the fact that the screw 20 is only tightened by hand, there is initially a relatively considerable slippage between the saw blade 22 and the inner flange 23 and outer flange 21. Because of its inertia, the saw blade 22 tries to remain stationary relative to the saw shaft 17. The saw blade 22 likewise tries to secure or retard the inner flange 23 and outer flange 21. This is only successful with respect to the inner flange 23 because the latter is rotatable relative to the saw shaft 17. With respect to the outer flange 21, retardation relative to the saw shaft 17 is impossible because there is a positive engagement between the outer flange 21 and the saw shaft 17 by means of the double-cheek 19' and the polygon recess. Consequently, only the inner flange 23 is retarded together with the outer disk 37 relative to the saw shaft 17. This leads to a relative rotation between the outer disk 37 and the inner disk 36, wherein the rolling bodies 38 roll in the cavities 49 and recesses 50 in elevated positions and thus attempt to increase the axial distance between the inner disk 36 and the outer disk 37. The outer disk 37 is accordingly moved axially jointly with the inner flange 23 in the direction of the saw blade 22 or against the outer flange 21. This leads to an increased clamping torque between the flanges 21, 23 and the saw blade 22.

If the rotating saw blade 22 is guided against a workpiece and engages therewith in a cutting manner, the saw blade 22 is once again retarded relative to the saw shaft 17, so that the automatic clamping mentioned above is repeated or continued so as to be reinforced by the frictional driving.

The clamping torque of the saw blade 22 has accordingly reached a maximum. When the drive motor or the motor shaft 28 is switched off by the on/off switch 13, the process takes place in reverse, as described above with respect to the starting of the machine or during a cutting engagement with a workpiece. This effect is further reinforced if a spindle stop is actuated which abruptly brings the saw shaft 17 to a stop through a positive engagement. Due to the inertial forces of the saw blade 22 which accordingly act in the opposite direction relative to the direction when starting, the inner flange 23 is driven in rotation along with it, wherein the axial spacing of the pair of disks 35 is reduced to its minimum. The clamping torque is reduced to a minimum value with the assistance of the leg spring 40. Due to the positive engagement between the outer flange 21 and the saw shaft 17, there is no danger that the head screw 19 will be loosened by an inertial force of the saw blade 22 acting in the loosening direction. An unwanted detachment of the saw blade or tool from the saw shaft 17 is accordingly excluded and operating reliability is substantially increased in connection with a hand-operated fast-clamping/fast-loosening device for a handheld circular saw or a disk grinding machine or the like.

What is claimed is:

1. Handheld machine tool comprising: a housing; a disk-shaped tool; driving means for driving said tool for rotation, said driving means including a tool shaft carrying said tool;

means for clamping said tool in said housing which include two supporting flanges supporting said tool therebetween, a clamping screw at an end of said tool shaft, and an internal threaded portion engaged with said clamping screw to secure one of said supporting flanges relative to said tool shaft, another of said supporting flanges being mounted on said tool shaft for easy rotation thereon and being supported with an extensive friction at one side of said tool; and adjusting means coupled with said another supporting flange and displacing said another supporting flange along an axis of said tool shaft towards said tool when said another supporting flange is rotated relative to said tool shaft due to rotation of said tool by said driving means during operation of the handheld machine tool, and said adjusting means clamping said tool with a decreasing force and urging said another supporting flange to automatically displace away from said tool along said axis when said tool is stopped and thereby reduce a clamping force.

2. Handheld machine tool according to claim 1, wherein said clamping screw is fastened relative to said tool shaft such that it cannot be carried along in said rotation, said flanges including an outer flange which is non rotatably mounted on said tool shaft, so that said clamping screw can not be driven in rotation in any rotary direction by said tool.

3. Handheld machine tool according to claim 1, wherein the handheld machine tool is a circular saw.

4. Handheld machine tool according to claim 1, wherein the handheld machine tool is a cutting-grinding machine.

5. Handheld machine tool comprising: a housing; a disk-shaped tool; driving means for driving said tool for rotation, said driving means including a tool shaft carrying said tool; means for clamping said tool in said housing and including two supporting flanges supporting said tool therebetween, a clamping screw at an end of said tool shaft, and an internal threaded portion engaged with said clamping screw to secure one of said supporting flanges relative to said tool shaft, another of said supporting flanges being mounted on said tool shaft for easy rotation thereon and being supported with an extensive friction at one side of said tool; and adjusting means coupled with said another supporting flange and displacing said another supporting flange along an axis of said tool shaft towards said tool when said another supporting flange is rotated relative to said tool shaft due to rotation of said tool by said driving means during operation of the handheld machine tool, and said adjusting means clamping said tool with a decreasing force and urging said another supporting flange to automatically displace away from said tool along said axis when said tool is stopped and thereby reduce a clamping force, wherein said adjusting means comprises a pair of disks having axially inclined surfaces and which are supported against one another via said axially inclined surfaces, and a spring, said disks rotating relative to one another so as to be pretensioned by said spring to try to occupy a position with a minimum axial spacing between said disks and, when said disks are rotated relative to one another out of said position, said disks are displaced by a predetermined maximum axial distance, wherein one of said disks is rotatable and is coupled with said another supporting flange such that said one of said disks is driven along in rotation, and another of said disks is coupled with said tool shaft so as to be fixed with respect to rotation relative thereto.

6. Handheld machine tool according to claim 5, and further comprising rolling bodies arranged between said disks such that said rolling bodies are enabled to roll.

7. Handheld machine tool according to claim 5, and further comprising rolling bodies, wherein at least said axially inclined surfaces of one of said disks receive said rolling bodies.

8. Handheld machine tool according to claim 5, and further comprising rolling bodies, wherein said axially inclined surfaces are arranged in cavities of axial surfaces of said disks for receiving said rolling bodies.

9. Handheld machine tool according to claim 5, wherein said axially inclined surfaces have uneven portions to generate a pressure point during clamping or loosening of said clamping means.

10. Handheld machine tool according to claim 5, wherein said one of said disks is arranged with an axial sleeve on said tool shaft and an outer circumference of said sleeve forms a bearing seat for a tool shaft bearing.

11. Handheld machine tool comprising a housing; a disk-shaped tool; driving means for driving said tool for rotation, said driving means including a tool shaft carrying said tool; means for clamping said tool in said housing which include two supporting flanges supporting said tool there between, a clamping screw at an end of said tool shaft, and an internal-threaded portion engaged with said clamping screw to secure one of said supporting flanges relative to said tool shaft, another of said supporting flanges being mounted on said tool shaft for easy rotation thereon and being supported with an extensive friction at one side of said tool; and adjusting means coupled with said another supporting flange and displacing said another supporting flange along an axis of said tool shaft towards said tool when said another supporting flange is rotated relative to said tool shaft due to rotation of said tool by said driving means during operation of the handheld machine tool, and said adjusting means clamping said tool with a decreasing force and urging said another supporting flange to automatically displace away from said tool along said axis when said tool is stopped and thereby reduce a clamping force, said adjusting means comprising a pair of disks having axially inclined surfaces and which are supported against one another via said axially inclined surfaces, and a spring, said disk rotating relative to one another so as to pretensioned by said spring to try to occupy a position with a maximum axial spacing between said disks and, when said disks are rotated relative to one another out of said position, said disks are displaced by a predetermined maximum axial distance, and wherein one of said disks is rotatable and is coupled with said another supporting flange such that said one of said disks is driven along in rotation, and another of said disks is coupled with said tool shaft so as to be fixed with respect to rotation relative thereto.

12. Handheld machine tool according to claim 1, and further comprising rolling bodies arranged between said disks such that said rolling bodies are enabled to roll.

13. Handheld machine tool according to claim 11, and further comprising rolling bodies, wherein at least said axially inclined surfaces of one of said disks receive said rolling bodies.

14. Handheld machine tool according to claim 11, and further comprising rolling bodies, wherein said axially inclined surfaces are arranged in cavities of axial surfaces of said disks for receiving said rolling bodies.

15. Handheld machine tool according to claim 11, wherein said axially inclined surfaces have uneven portions to generate a pressure point during clamping or loosening of said clamping means.

16. Handheld machine tool according to claim 11, wherein said one of said disks is arranged with an axial sleeve on on said tool shaft and an outer circumference of said sleeve forms a bearing seat for a tool shaft bearing.

* * * * *